Patented Nov. 29, 1938

2,138,546

UNITED STATES PATENT OFFICE 2,138,546

THERAPEUTIC PREPARATION OF COLLOIDAL SULPHUR

Raymond L. High, Philadelphia, Pa.

No Drawing. Application December 20, 1935, Serial No. 55,414

3 Claims. (Cl. 167—72)

My invention relates to the manufacture of a new composition of matter for intra-muscular injection, containing elementary sulphur in a stable colloidal state, for the treatment of acute and chronic rheumatism, arthritis and other similar diseases.

Medicinal chemistry literature as well as patents describe various methods of manufacturing sulphur containing preparations; all have the common principle of developing sulphur derivatives, or the sulphur is dissolved or is finely divided in an aqueous or other miscible medium. The fundamental characteristics of sulphur derivatives is their unsteadiness: especially in an aqueous medium, where sooner or later, there is a chemical conversion, a chemical decomposition or a precipitation. In most of the cases the results of the previously mentioned reactions are quite visible to the naked eye: to wit: there results a change in consistency, hence, inhomogeneousness and precipitation are the most common symptoms of such occurrences.

Looking at these conditions from a physiological angle, the clinical results with such unstable preparations are inadequate for their purpose and this is apparent when considering the continuous fluctuation of the sulphur content and the continuous change of its state.

The other class of products, the oleaginous sulphur preparations are of similar unstable character, since here too, the sulphur is either in the form of an oil soluble compound or directly attached to the oil molecule, or finally is dissolved in the oil present.

Many years of clinical practice, conducted parallel with chemical research work resulted in the following scientific facts:

1. Only such aqueous and oleaginous sulphur preparations examined with an ultra microscope show Brownian movements if and as long as colloidal sulphur compounds are yet present.

2. No aqueous and no oleaginous sulphur preparations show Brownian movements if only the free sulphur is left and no other compound of a colloidal nature is present.

This research result can now be summarized, as follows: that all the so-called colloidal sulphur preparations developed until now and intended for injection are more or less unstable, regardless of the form in which the sulphur is present. This unsteadiness manifests itself in two different ways. (1) If the preparation consists of sulphur compounds dissolved or emulsified in water or in oil, sooner or later an inevitable chemical reaction will set in thereby converting colloids to non-colloids. (2) If free sulphur is present in an equeous preparation the influence of air and light is sufficient to initiate chemical reactions between water, sulphur and oxygen, transforming thereby the free sulphur into sulphur compounds of a decidedly non-colloidal nature. Finally, free sulphur emulsified in oil also does not stand up and suffers, in a short time when put in ampoules, either a chemical or physical change so that in both cases it loses its colloidal character.

My invention pertains to a medicinal preparation comprising elementary sulphur of a colloidal state dispersed in an oleaginous medium where it will be stabilized for an infinite length of time.

An object of my invention is to disclose a process of preparing and manufacturing a colloidal sulphur composition suitable for injection, in which:

1. All the sulphur is present in its elementary form and not combined in form of sulphides, sulphites, polysulphites, thiosulphates or mixed with the same.

2. All the sulphur is present in a colloidal state.

3. All the sulphur remains in its original colloidal state uniformly dispersed in the composition and stays in that condition for an infinite length of time.

Another object of my invention is to prepare a new therapeutic agent for injection wherein colloidal sulphur is suspended in a vegetable oil which is readily acceptable by the human system.

Another object of my invention is to provide in a sulphur colloid for therapeutic purposes a protective dispersing agent of lecithin or cholesterol for the colloid.

The novel features which I consider characteristic of my invention are set forth with particularity in the appended claims. The invention itself, however, both as to its composition and method of compounding, together with additional objects and advantages thereof, will best be understood from the following description of a specific embodiment.

Process of manufacture

In a mechanical mortar, wherein the crusher is replaced by numerous balls of porcelain, colloidal sulphur is mixed with only so much chaulmoogra oil suitably processed until a salvelike homogeneous product is obtained. To this sulphur base gradually under continuous operation, so much more oil is added until for each 55 milligrams of sulphur, 5 cubic centimeters of oil is present. Although I have mentioned proportions, I realize that derivations may be made from the mentioned proportions as shall hereinafter appear. This intermediate product is now placed into a separator where the conglomerated part of sulphur is thrown out or expelled. To this oil now lecithin or cholesterol dissolved in chaulmoogra oil is added through the use of a small mechanical agitator. Finally this product is driven through a colloidal mill.

The preparation thus obtained is a perfectly clear oil with a superb brilliancy and contains a minimum amount of 30 mgm. elementary colloidal sulphur in 5 c. c. of oil and shows a distinctly strong Brownian movement after a long period of standing of a period of years, which is an indication of its fresh condition. A quantitative analysis of this product, taken from a sealed ampoule after the ampoule was exposed to light for one year, determined 30–31 mgm. of colloidal sulphur in 5 c. c. of oil. For proven physiological reasons, I prefer to use only chaulmoogra oil. However, I may use any blend of vegetable or mineral oil which has been properly processed, as for example: olive oil.

*Bio-chemical improvements*

In the above outlined new method of manufacture for this new medicinal preparation, I avoid and eliminate all the different causes which in other similar products lead to a final destruction of their effectiveness. This is secured through the absence of hydroxyl-ions, metallic ions and acid radicals in the form of water or sulphur derivatives. I succeeded in developing a neutral oleaginous system in which solely elementary sulphur is present in chemically pure condition as a 100% active colloid substance and in infinitely lasting balanced stability.

Through injection of this pure elementary sulphur of a colloidal nature in the blood system, I introduce simply a new colloidal phase in the physiologically most acceptable form, which new phase on account of its lively activity is soon resorbed in its entirety, without the risk of causing even the slightest change in the blood system. This so-called sulphur is now in the same form and the absolutely identical state in the blood circulation present as had it entered same through the digestive channels.

The use of lecithin or cholesterol in the colloid of sulphur and oil has a new two-fold object. It not only serves as a protective dispersing agent for the colloid, but the same time it secures an easy and quick resorbtion of this preparation by the muscular cells and also makes the preparation promptly soluble in lipoid substances. This means that the lecithin or cholesterol enables the oil to penetrate the cellular wall without previous decomposition by which the time needed for the penetration through the cells into the blood stream is materially cut and therefore its action is intensified.

I wish here to be understood that I do not desire to be limited to the exact given proportions of oil-sulphur as described, nor to the sequences of operation as put down in the manufacturing process, as it is obvious that modification may be made.

Although I have described a specific embodiment of my invention, I am fully aware that many modifications thereof and changes therein are possible without departing from the spirit of my invention, since the proportions of sulphur may be varied as 20 milligrams of colloidal sulphur to 5 cubic centimeters of oil may be used, and the oleaginous base employed may be changed, so that the product is liquid, semi-liquid or solid.

Since my invention is capable of various modifications, I intend it not to be limited except as is necessitated by the prior art and the spirit of the appended claims.

I claim:

1. A composition of matter for therapeutic purposes comprising a stable colloidal emulsion of elementary sulphur in vegetable oil and a protective dispersing agent of lecithin.

2. A new composition of matter comprising a colloidal emulsion of elementary sulphur, a protective dispersing agent of lecithin, and an oleaginous base.

3. A new composition of matter comprising an elementary sulphur in a colloidal state emulsified in oil in the presence of a protective dispersing agent of lecithin.

RAYMOND L. HIGH.